(12) United States Patent
Courtright et al.

(10) Patent No.: US 7,591,283 B2
(45) Date of Patent: Sep. 22, 2009

(54) LOW RISE RATE DIRECT ACTING RELIEF VALVE

(75) Inventors: Dennis O. Courtright, Easley, SC (US); Enzo Soncini, Raggio Nell Emilia (IT); Davide I. Davoli, Reggio Nell Emilia (IT)

(73) Assignee: Sauer-Danfoss, Inc., Ames, IA (US)

( * ) Notice: Subject to any disclaimer, the term of this patent is extended or adjusted under 35 U.S.C. 154(b) by 94 days.

(21) Appl. No.: 11/745,035

(22) Filed: May 7, 2007

(65) Prior Publication Data
US 2008/0276997 A1 Nov. 13, 2008

(51) Int. Cl.
F16K 21/10 (2006.01)

(52) U.S. Cl. .............................. 137/514.5; 137/543.15

(58) Field of Classification Search ............ 137/543.15, 137/496, 540, 514, 514.3, 514.5, 514.7, 535
See application file for complete search history.

(56) References Cited

U.S. PATENT DOCUMENTS

| | | | |
|---|---|---|---|
| 3,373,763 A | 3/1968 | Smlges et al. | |
| 3,487,852 A | 1/1970 | Kikendall | |
| 4,074,695 A | 2/1978 | Weirich et al. | |
| 5,129,419 A | * 7/1992 | Stapleton | 137/514.3 |
| 5,706,849 A | 1/1998 | Uchida et al. | |
| 5,727,594 A | 3/1998 | Choksi | |
| 5,971,016 A | 10/1999 | Wass et al. | |
| 6,289,927 B1 | 9/2001 | Kaneko | |
| 6,536,467 B2 | 3/2003 | Wu et al. | |
| 6,675,824 B2 | 1/2004 | Collado et al. | |
| 6,837,266 B2 | 1/2005 | Fredrickson et al. | |

* cited by examiner

*Primary Examiner*—John Rivell
*Assistant Examiner*—Macade Brown

(57) ABSTRACT

A relief valve assembly. The relief valve assembly has a housing that houses a sleeve element that surrounds a spool that has a spring guide disposed therein and is biased away from the spool by a spring. A fluid flow path is created from a valve exit of the assembly through the sleeve and spool via a series of openings, grooves and orifices in at least one position of the relief valve assembly. The fluid flow path acts to reduce pressure rise rate.

6 Claims, 1 Drawing Sheet

LOW RISE RATE DIRECT ACTING RELIEF VALVE

BACKGROUND OF THE INVENTION

This invention relates to relief valves. More specifically, this invention relates to relief valve assemblies for controlling charge flow pressure in a hydrostatic pump.

A typical direct acting relief valve has a high pressure rise rate. As the flow increases through the relief valve the pressure at the inlet increases. The typical pressure rise rate is greater than two bars per ten 1 μm of flow. This increase of pressure is a power drain from the engine.

The pressure rise rate associated with relief valves is dependent on the back pressure in the cavity or exit port. The spring chamber of the valve is referenced to the back pressure in the cavity. In a typical screw-in valve cavity the pressure within the cavity at the exit is variable as a function of the radial location relative to the spring chamber vent location. The pressure is lowest near the cavity exit and it is highest at 180 degrees from the exit. The typical method to sense the downstream pressure is with an opening such as a drilled hole or a slot that connects to the spring chamber of the valve. Because the valve is a screw-in type, the radial orientation of the spring chamber vent within the cavity cannot be controlled. The pressure rise rate is dependent upon the radial location of the spring chamber vent relative to cavity exit.

Therefore, it is a principal object of the present invention to significantly reduce the radial orientation effect on the pressure rise rate in a relief valve within a hydrostatic pump.

Yet another object of the present invention is to provide an improved relief valve to control the charge flow pressure in a hydrostatic pump that minimizes rise rate.

These and other advantages, features, or the like will become apparent from the specification and the claims.

BRIEF SUMMARY OF THE INVENTION

A relief valve assembly for controlling charge flow pressure in a hydrostatic pump. The assembly comprises a housing having a first and second end and having a cavity disposed therein in fluid communication with an inlet passageway at the second end. A sleeve element is disposed within the cavity and has at least one opening therein and additionally has an inner surface with a groove that is in communication with the opening. A spool is disposed within the sleeve element and has a groove on an outer surface. Additionally, the assembly has a spring guide within a spring chamber that extends from a first end to a second end that is disposed within the spool. Additionally, in at least one position fluid flows in a fluid flow path through the opening in the sleeve into the groove on the inner surface of the sleeve to the groove on the outer surface of the spool and through an orifice in the sleeve into the spring chamber to minimize rise rate.

BRIEF DESCRIPTION OF THE DRAWINGS

The FIGURE is a sectional view of a relief valve of a hydrostatic pump.

DETAILED DESCRIPTION OF THE PREFERRED EMBODIMENT

Figure 1:
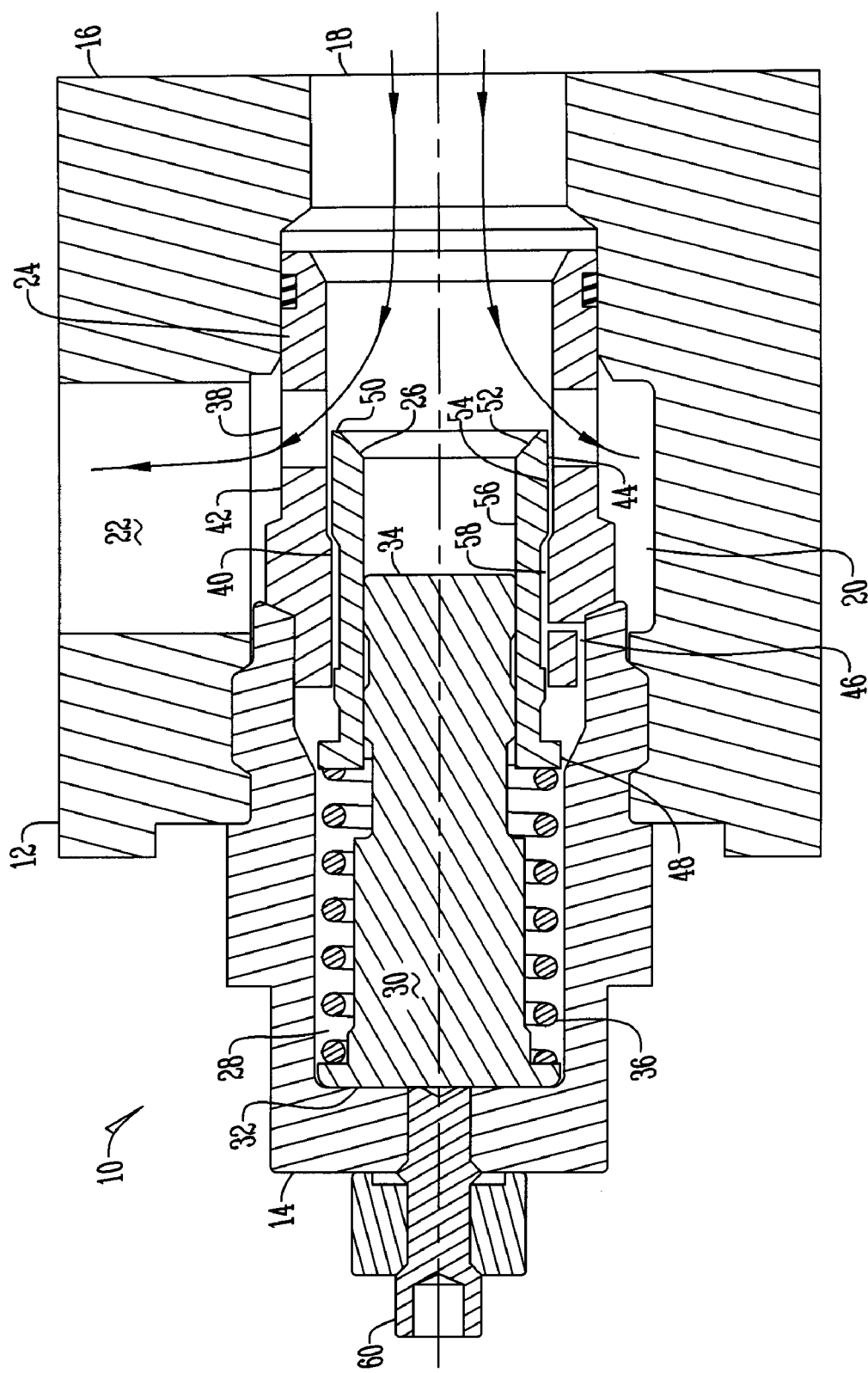

The FIGURE shows a relief valve assembly 10 that is used to control the charge flow pressure in a hydrostatic pump. The relief valve assembly 10 comprises a housing 12 that extends from a first end 14 to a second end 16. Within the second end 16 is an inlet passageway 18 that is disposed through the housing 12. Additionally, the housing 12 has a cavity 20 that leads to an exit passageway 22. Within the cavity 20 is a sleeve element 24 that surrounds a spool 26. Disposed within a spring chamber 28 is a spring guide 30 that in general is T-shaped extending from a first end 32 to a second end 34 that is disposed within the spool 26 wherein the first end 32 has a greater diameter than the second end 34. Additionally, within the spring chamber 28 is a spring 36 that biases against the first end 32 of the spring guide 30.

Sleeve element 24 has an opening 38 or cross drilled hole, therein that provides fluid communication with the cavity 20. The sleeve element 24 additionally has inner and outer surfaces 40, 42 wherein a groove 44 is disposed within the inner surface 40 extending from the opening 38. Additionally disposed within the sleeve is an orifice 46.

The spool 26 extends from a first end 48 to a second end 50 wherein the second end has an angled surface 52 to represent a differential area created between and outside diameter 54 and inside diameter 56 of the spool. The spool 26 additionally has a groove 58 in its outside diameter 54 such that in at least one position of the spool 26 the groove 58 on the outside diameter 54 of the spool 26 provides a fluid communication path between the groove 44 on the inner surface 40 of the sleeve element 24 and the orifice 46 of the sleeve element 24.

Additionally, at the first end 14 of the housing 12 is an adjustment screw 60 that is disposed through the first end 14 of housing 12. The adjustment screw 60 contacts the first end 32 of the spring guide 30 in order to regulate the displacement of the spring guide 30.

In operation, the inlet flow enters the valve housing 12 through the sleeve element 24. Pressure acts on the spool 26 and the spring guide 30 such that the pressure pushes the spring guide 30 against the adjustment screw 60 as the pressure in the spring chamber 28 is lower than the inlet passageway 18 of the valve assembly 10. The pressure acts on the differential area created by the outside and inside diameters 54, 56 of the spool 26. The downstream pressure is connected to the spring chamber 28 giving a differential pressure across the spool 26. The differential area allows a lower spring force requirement for an adjusted range as compared to a solid diameter spool.

As the pressure acting on the spool 26 increases to a value that balances the load produced by the spring 36 that is biased to close the valve assembly 10, the spool 26 begins to move toward the first end 14 of the housing 12 to provide access to the opening 38 in the sleeve element 24. As the spool 26 uncovers the opening 38 in the sleeve element 24 the flow passes through the downstream side of the cavity 20. As the spool 26 strokes open, the spring 36 is compressed. As a result of the spring 36 compressing, the pressure required to maintain the spool position increases to balance the added force.

The sleeve element 24 incorporates under cut groove 44 that connects with groove 58 on the outside diameter 54 of the spool 26. This spool groove 58 connects with the small orifice 46 near the end of the sleeve element 24 that connects to a milled flat on the threads of the sleeve 24. This fluid flow path connects the pressure at the valve exit in the cavity 20 with the spring chamber 28. Because this fluid flow path is equally spaced around the circumference of the valve assembly 10 the downstream pressure is not influenced by the radial orientation within the cavity 20. Therefore, as the flow increases the pressure in the opening 38 decreases as a result of the velocity of the flow jet leaving the valve assembly 10. The lower pressure at this location directly corresponds to a lower spring chamber pressure and assists with counteracting the increase of spring load.

As a result, downstream pressure is connected with the spring chamber 28 to function as a venturi to pull a vacuum to lower the spring chamber pressure as a function of the amount of flow passing through the valve assembly 10. Consequently, rise rate is greatly reduced providing a very low pressure rise rate as compared to rise rates in prior art relief valves. Thus, at the very least, all of the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A relief valve assembly for controlling charge flow pressure in a hydrostatic pump comprising:
   a housing having a first and second end and having a cavity disposed therein in fluid communication with an inlet passageway at the second end;
   a sleeve element disposed within the cavity and having at least one opening therein and having an inner surface with a groove in communication with the opening;
   a spool disposed within the sleeve element and having a groove on an outer surface that connects with an orifice in the sleeve element;
   a spring guide within a spring chamber extending from a first end to a second end wherein the second end is disposed within the spool; and
   wherein in at least one position fluid flows in a fluid flow path through the opening in the sleeve into the groove on the inner surface of the sleeve to the groove on the outer surface of the spool and through the orifice in the sleeve into the spring chamber.

2. The relief valve assembly of claim 1 wherein the fluid flow path connects pressure at a valve exit with the spring chamber.

3. The relief valve assembly of claim 1 wherein as flow increases pressure at the opening in the sleeve decreases to counteract a spring load.

4. The relief valve assembly of claim 1 wherein a pressure acts on a differential area created by an outside diameter of the spool and the inside diameter of the spool.

5. The relief valve assembly of claim 4 wherein the differential area lessens a spring force.

6. The relief valve assembly of claim 4 further comprising an adjustment screw at the first end of the housing to adjust the spring guide.

\* \* \* \* \*